US 8,334,386 B2

(12) United States Patent
Loebel et al.

(10) Patent No.: US 8,334,386 B2
(45) Date of Patent: Dec. 18, 2012

(54) AQUEOUS SYNTHESIS OF PERYLENE PIGMENTS

(75) Inventors: Johannes Loebel, Mannheim (DE); Andreas Stohr, Freinsheim (DE)

(73) Assignee: BASF SE, Ludwigshafen (DE)

( * ) Notice: Subject to any disclaimer, the term of this patent is extended or adjusted under 35 U.S.C. 154(b) by 289 days.

(21) Appl. No.: 12/667,334

(22) PCT Filed: Jun. 30, 2008

(86) PCT No.: PCT/EP2008/058378
§ 371 (c)(1),
(2), (4) Date: Dec. 30, 2009

(87) PCT Pub. No.: WO2009/003980
PCT Pub. Date: Jan. 8, 2009

(65) Prior Publication Data
US 2010/0184983 A1    Jul. 22, 2010

(30) Foreign Application Priority Data

Jul. 3, 2007  (EP) .................................... 07111661

(51) Int. Cl.
*C07D 471/04* (2006.01)
(52) U.S. Cl. ........................................................ 546/27
(58) Field of Classification Search ...................... 546/27
See application file for complete search history.

(56) References Cited

U.S. PATENT DOCUMENTS

| 1,808,260 | A | 6/1931 | Schmidt et al. |
| 1,878,986 | A | 9/1932 | Schmidt et al. |
| 6,174,361 | B1 | 1/2001 | Urban et al. |
| 2003/0167971 | A1 | 9/2003 | Schulz |
| 2007/0151478 | A1 | 7/2007 | Erk et al. |

FOREIGN PATENT DOCUMENTS

| CH | 373844 | 1/1964 |
| EP | 0 979 846 | 2/2000 |
| FR | 852 254 | 1/1940 |
| WO | 2004 009688 | 1/2004 |
| WO | 2005 078023 | 8/2005 |

OTHER PUBLICATIONS

W. Herbst, et al., "Industrielle Organische Pigmente (Industrial Organic Pigments)", VCH Verlag, Weinheim, 1987, pp. 473-475 (previously submitted 2nd Edition published in 1995 on Jul. 27, 2010).

U.S. Appl. No. 13/122,514, filed Apr. 4, 2011, Kleine Jaeger, et al.
Feiler, L. et al. : Synthesis of Perylene-3, 4-Dicarboximides—Novel Highly Photostable fluorescent Dyes, Liebigs Annalen, vol. 7, pp. 1229-1244, (Jan. 1, 1995), XP 001041286.
Herbst, W. et al., "Industrielle Organische Pigmente", VCH, pp. 484-485 (1995) XP 002529261.
Lukac, I. et al., "Darstellung and Fluoreszenzverhalten von 2, 3, 4, 4a, 10a, 11, 12, 13-Octahydro-1, 4a, 10a, 14-tetraazaviolanthron-Derivaten", Chem.Ber., vol. 116, pp. 3524-3528, (1983) XP002529260.
Langhals, H. et al., "Perylenamidine-Imide Dyes", Liebigs Annalen, pp. 481-486 (Jan. 1, 1995) XP002189733.

*Primary Examiner* — Joseph K. McKane
*Assistant Examiner* — Samantha Shterengarts
(74) *Attorney, Agent, or Firm* — Oblon, Spivak, McClelland, Maier & Neustadt, L.L.P.

(57) ABSTRACT

A process for preparing perylene pigments of the general formula (Ia) or (Ib)

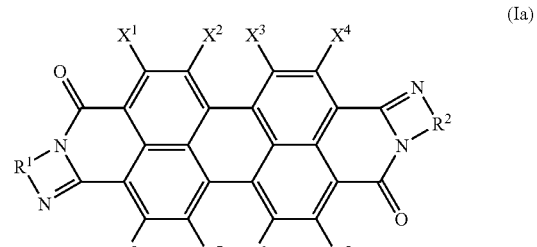

(Ia)

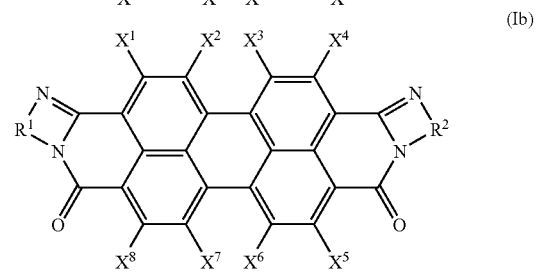

(Ib)

or mixtures thereof, by reacting perylenetetracarboxylic acids or functional derivatives thereof with aromatic diamines, where $R^1$, $R^2$ may be the same or different and may each independently be phenylene, naphthylene or pyridylene, where $R^1$, $R^2$ may each be mono- or polysubstituted by $C_1$-$C_{22}$-alkyl, $C_3$-$C_{22}$-alkenyl, $C_1$-$C_{22}$-alkoxy, hydroxyl and/or halogen, $X^1$, $X^2$, $X^3$, $X^4$, $X^5$, $X^6$, $X^7$, $X^8$ may be the same or different and may each independently be hydrogen or halogen, wherein the reaction is performed in the presence of a secondary or tertiary amine in an aqueous reaction medium.

21 Claims, No Drawings

AQUEOUS SYNTHESIS OF PERYLENE PIGMENTS

The present invention relates to processes for preparing perylene pigments. The invention further relates to the use of perylene pigments for coloring high molecular weight organic and inorganic materials of natural and synthetic origin, especially coatings, printing inks, other inks, polymers, paints, plastics articles, glasses, silicatic layer systems and organic-inorganic composites. Further embodiments of the present invention can be taken from the claims, the description and the examples. It will be appreciated that the features of the inventive subject matter which have been specified above and are yet to be explained below can be used not only in the combination stated specifically in each case but also in other combinations without leaving the scope of the invention.

The preparation of halogenated perylenetetracarboxylbisbenzimidazoles in substance has already been known for some time in connection with the preparation of vat dyes, for example from U.S. Pat. No. 1,808,260. However, the decomposition products contaminate the product, such that the migration fastness in the application medium is limited. Owing to the sometimes costly diamine raw materials, such a preparation is often economically unviable.

Perylenetetracarboxylbisbenzimidazoles are frequently prepared by the reaction of one equivalent of perylenetetracarboxylic acid, the anhydride thereof or halogenated derivatives of the two compounds with two equivalents of a diamine by a condensation reaction.

U.S. Pat. No. 1,878,986 describes a process for preparing halogenated perylenetetracarboxylbisbenzimidazoles which are preferably converted in aromatic alcohols (phenol, cresol, etc.) or glacial acetic acid. To accelerate the reaction, it is possible to use anhydrous basic alkali metal salts or copper compounds.

WO 2005/078023 describes the synthesis of perylene pigments by condensing perylene-3,4:9,10-tetracarboxylic dianhydride in high-boiling solvents such as phenol, nitrobenzene, naphthalene or naphthalene derivatives. The two-stage reaction is accelerated by adding catalysts such as zinc acetate, zinc chloride, zinc oxide, acetic acid, hydrochloric acid, para-toluenesulfonic acid or amines. In the process described, preference is given to using phenol as the solvent and to working at temperatures between 160 and 180° C. During the reaction, the water of reaction is distilled off as an azeotrope with phenol.

FR 852.254 points out the problems of reaction at relatively low temperatures. The condensation of perylenetetracarboxylic acid or derivatives thereof with a small excess of 1,2-diaminobenzene in nitrobenzene or glacial acetic acid at 120° C. affords N,N'-di(o-amino)arylperylenetetracarboximides or 3,4-benzimidazole-9,10-(o-amino)arylperylenetetracarboximides. The two products are vat dyes and not pigments.

A further method for preparing different perylene pigments is described in CH 373844. As a result of the reaction in organic solvents or water, pigment dyes are prepared under highly dilute synthesis conditions. The condensation agents used are metal halides such as zinc chloride and aluminum chloride, but the reaction can also be performed in the presence of catalysts such as sulfuric acid, phosphoric acid or Lewis acids.

In general, the use of high-boiling solvents cannot prevent residues in the pigments, since solvent molecules are frequently incorporated in the crystal lattice in the course of the formation process of the pigments or are involved in the aggregation or agglomeration of primary particles of the pigments and often cannot be removed even at very high drying temperatures. Processing in plastics, coatings or other application media often destroys the agglomerates or aggregates of primary particles and releases the residual solvent in an often undesired manner.

The high demand for metal- and solvent-free colorants, especially pigments, is unbroken, especially from the environmental point of view. It was therefore an object of the invention to provide an easily performable process for preparing perylene pigments, in which the content of organic solvent residues and/or metals in the finished pigments is minimized or completely prevented.

These and other objects are, as is evident from the disclosure content of the present invention, achieved by the various embodiments of the process according to the invention which are described hereinafter.

Accordingly, a process has been found for preparing perylene pigments of the general formula (Ia) or (Ib)

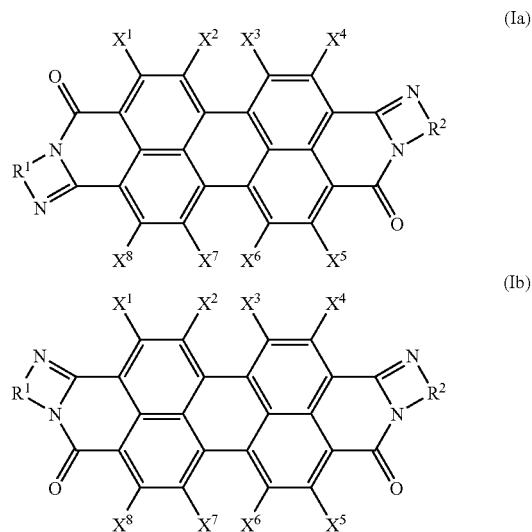

or mixtures thereof, where
  $R^1$, $R^2$ are the same or different and are each independently phenylene, naphthylene or pyridylene,
  where $R^1$, $R^2$ may each be mono- or polysubstituted by $C_1$-$C_{22}$-alkyl, $C_1$-$C_{22}$-alkoxy, hydroxyl and/or halogen,
  $X^1, X^2, X^3, X^4, X^5, X^6, X^7, X^8$ may be the same or different and may each independently be hydrogen or halogen,
wherein perylenetetracarboxylic acids or functional derivatives thereof are reacted with aromatic diamines in the presence of a secondary or tertiary amine in an aqueous reaction medium.

The term "mixture" shall comprise physical mixtures, and also preferably solid solutions (mixed crystals) of compounds (Ia) and (Ib).

In the context of this invention, expressions of the form $C_a$-$C_b$ denote chemical compounds or substituents having a particular number of carbon atoms. The number of carbon atoms can be selected from the entire range from a to b, including a and b; a is at least 1 and b is always greater than a. The chemical compounds or the substituents are specified further by expressions of the form $C_a$-$C_b$-V. In this case, V represents a chemical compound class or substituent class, for example alkyl compounds or alkyl substituents.

Halogen represents fluorine, chlorine, bromine or iodine, preferably fluorine, chlorine or bromine, more preferably chlorine or bromine.

Specifically, the collective terms specified for the different substituents are each defined as follows:

$C_1$-$C_{22}$-Alkyl: straight-chain or branched hydrocarbon radicals having up to 22 carbon atoms, preferably $C_1$-$C_{12}$-alkyl, for example $C_1$-$C_{10}$-alkyl or $C_{11}$-$C_{22}$-alkyl, more preferably $C_1$-$C_{10}$-alkyl, for example $C_1$-$C_3$-alkyl, such as methyl, ethyl, propyl, isopropyl, or $C_4$-$C_6$-alkyl, n-butyl, sec-butyl, tert-butyl, pentyl, 2-methylbutyl, 1,1-dimethylpropyl, 1,2-dimethylpropyl, 2,2-dimethylpropyl, 1-ethylpropyl, hexyl, 2-methylpentyl, 3-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethylpropyl, 1,2,2-trimethylpropyl, 1-ethyl-1-methylpropyl, 1-ethyl-2-methylpropyl, or $C_7$-$C_{10}$-alkyl such as heptyl, octyl, 2-ethylhexyl, 2,4,4-trimethylpentyl, 1,1,3,3-tetramethylbutyl, nonyl or decyl, and isomers thereof.

$C_3$-$C_{22}$-Alkenyl: unsaturated, straight-chain or branched hydrocarbon radicals having from 3 to 22 carbon atoms and a double bond in any position, for example $C_3$-$C_{10}$-alkenyl or $C_{11}$-$C_{22}$-alkenyl, preferably $C_3$-$C_{10}$-alkenyl such as $C_3$-$C_4$-alkenyl, such as 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, or $C_5$-$C_6$-alkenyl, such as 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl or 1-ethyl-2-methyl-2-propenyl, and also $C_7$-$C_{10}$-alkenyl, such as the isomers of heptenyl, octenyl, nonenyl or decenyl.

$C_1$-$C_{22}$-Alkoxy: is a straight-chain or branched alkyl group which has from 1 to 22 carbon atoms (as specified above) and is attached via an oxygen atom (—O—), for example $C_1$-$C_{10}$-alkoxy or $C_{11}$-$C_{22}$-alkoxy, preferably $C_1$-$C_{10}$-alkyloxy, especially preferably $C_1$-$C_6$-alkoxy, for example methoxy, ethoxy, propoxy, butoxy, pentoxy, hexoxy.

Aryl: a mono- to tricyclic aromatic ring system comprising from 6 to 14 carbon ring members, for example phenyl, naphthyl or anthracenyl, preferably a mono- to bicyclic, more preferably a monocyclic, aromatic ring system.

Heterocycles: five- to twelve-membered, preferably five- to nine-membered, more preferably five- to six-membered, ring systems having oxygen, nitrogen and/or sulfur atoms and optionally a plurality of rings, such as furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl. For example also piperidinyl or pyrrolidinyl.

$C_3$-$C_{12}$-Cycloalkyl: monocyclic saturated hydrocarbon groups having from 3 up to 12 carbon ring members, preferably $C_3$-$C_8$-cycloalkyl such as cyclopropyl, cyclobutyl, cyclopentyl, cyclohexyl, cycloheptyl or cyclooctyl.

In the process according to the invention, the phenylene, naphthylene and pyridylene radicals $R^1$ and $R^2$ in the formulae (Ia) and (Ib) may preferably be mono- or polysubstituted by $C_1$-$C_{12}$-alkyl, especially $C_1$-$C_4$-alkyl, $C_1$-$C_8$-alkoxy, in particular $C_1$-$C_4$-alkoxy, hydroxyl and/or halogen, especially chlorine or bromine.

In one embodiment of the process according to the invention, the phenylene, naphthylene and pyridylene radicals are, however, preferably unsubstituted, particular preference being given to the phenylene and naphthylene radicals and very particular preference to the naphthylene radicals.

Preferably at most four of the substituents $X^1$ to $X^8$ are halogen, especially chlorine. Most preferably, all substituents $X^1$ to $X^8$ are hydrogen.

Preference and particular preference are given to those embodiments of the process according to the invention in which the substituents $R^1$, $R^2$ and $X^1$ to $X^8$ assume their preferred and particularly preferred definition respectively.

According to the invention, perylene pigments of the general formula (Ia) or (Ib) or mixtures thereof are prepared by reacting perylenetetracarboxylic acids or functional derivatives thereof with aromatic diamines in the presence of a secondary or tertiary amine in an aqueous reaction medium.

"Perylenetetracarboxylic acids" are understood to mean perylene-3,4:9,10-tetracarboxylic acids.

The perylenetetracarboxylic acids used in the process according to the invention or functional derivatives thereof and diamines are either commercially available or can be prepared by processes known to those skilled in the art (W. Herbst, K. Hunger, "Industrielle organische Pigmente" [Industrial Organic Pigments], 1987, VCH Verlag, Weinheim, p. 473ff).

The "functional derivatives" of the perylenetetracarboxylic acids are understood to mean those compounds which can react with the diamines to give perylene pigments under the reaction conditions of the process according to the invention. Mention should be made here in particular of the perylenetetracarboxylic anhydrides (perylene bisanhydrides), perylenetetracarbonyl chlorides or salts of the perylenetetracarboxylic acids. Preference is given to using perylene bisanhydrides.

Perylenetetracarboxylic acids or functional derivatives thereof, especially perylene bisanhydride, can be used as starting materials in the process according to the invention in the form of dried crude material, precomminuted crude material or preferably as water-moist presscake which is obtained in the synthesis (W. Herbst, K. Hunger, "Industrielle organische Pigmente", 1987, VCH Verlag, Weinheim, p. 473ff).

In the context of the present invention, the "aromatic diamines" are understood to mean the following ortho- or peri-diamines: 1,2-diaminobenzene, 2,3-diaminopyridine, 3,4-diaminopyridine, 4,5-diaminopyrimidine, 1,8-diaminonaphthalene, 4,5-diaminoquinoline, 4,5-diaminoisoquinoline, 1,8-diaminoisoquinoline. Preference is given to using 1,2-diaminobenzene or 1,8-diaminonaphthalene.

If desired, in one embodiment of the preparation process according to the invention, it is also possible to use mixtures of different aromatic diamines. According to the desired properties of the perylene pigments, the composition may vary over a wide range. Preference is given here to using mixtures of two different diamines. Preference is given here to replacing up to 10% by weight, more preferably up to 5% by weight, of the first diamine with the second diamine in order to obtain perylene pigments with modified properties.

The molar ratio of the aromatic diamine to the perylenetetracarboxylic acids or functional derivatives thereof, especially perylene bisanhydride, is generally from 1.8:1 to 4:1, preferably from 1.9:1 to 3:1, more preferably from 1.9:1 to 2.5:1.

If an excess of perylenetetracarboxylic acids or functional derivatives thereof, especially perylene bisanhydride, or aromatic diamine is employed, it is possible, on completion of reaction, to add, for example to the pigment suspension which forms, an inorganic basic salt, preferably potassium carbonate or potassium hydroxide, and to wash with inorganic or organic acid in order to dissolve raw material residues and to remove them in the filtration.

In the preparation process according to the invention, the reaction is performed in the presence of a secondary or tertiary amine. It is suspected here that the secondary or tertiary amine has the role of a catalyst for the reaction and can generally influence the particle size and particle shape of the pigment primary particles. According to the application, depending on the secondary or tertiary amine selected, it is therefore possible to prepare specific perylene pigment particles.

Suitable secondary or tertiary amines are aliphatic, cycloaliphatic, arylaliphatic or heterocyclic, secondary or tertiary amines.

In general, suitable secondary amines have the formula R'R"NH where R', R" may be the same or different and may each be $C_1$-$C_{22}$-alkyl, $C_3$-$C_{12}$-cycloalkyl, aryl or heterocycles, where R', R" may be substituted by hydroxyl, $C_1$-$C_6$-alkoxy, $C_1$-$C_6$-alkyl, $C_1$-$C_6$-alkylamino or aryl groups, or R' and R", together with the nitrogen atom from R'R"NH, form a 5- or 6-membered heterocyclic ring which may also comprise further heteroatoms. R', R" are preferably the same or different and are each $C_1$-$C_8$-alkyl, $C_3$-$C_8$-cycloalkyl, aryl, which may be substituted as described above. Also preferably, R' and R", together with the nitrogen atom, form a 5- or 6-membered heterocyclic ring which may also comprise a further nitrogen atom.

Particularly preferred secondary amines are imidazole, piperazine, N-cyclohexylmethylamine and N-cyclohexylethylamine.

In general, suitable tertiary amines have the formula R'R"NR''' where R', R" may be the same or different and may each be $C_1$-$C_{22}$-alkyl, $C_3$-$C_{12}$-cycloalkyl, aryl or heterocycles, where R', R" may be substituted by hydroxyl, $C_1$-$C_6$-alkoxy, $C_1$-$C_6$-alkyl, $C_1$-$C_6$-alkylamino or aryl groups, or R' and R", together with the nitrogen atom from R'R"NR''', form a 5- or 6-membered heterocyclic ring which may also comprise further heteroatoms. R', R" are preferably the same or different and are each $C_1$-$C_8$-alkyl, $C_3$-$C_8$-cycloalkyl, aryl, which may be substituted as described above. Also preferably, R' and R", together with the nitrogen atom, form a 5- or 6-membered heterocyclic ring which may also comprise a further nitrogen atom. Particular preference is given to imidazole, pyridine and pyrimidine.

R''' is $C_1$-$C_{22}$-alkyl or aryl, where R''' may be substituted by hydroxyl, $C_1$-$C_6$-alkoxy, $C_1$-$C_6$-alkyl, $C_1$-$C_6$-alkylamino or aryl groups. R''' is preferably $C_1$-$C_6$-alkyl or aryl.

Preferred secondary or tertiary amines are piperazine, N-(2-hydroxyethyl)piperazine, diethanolamine, N,N'-dimethylpiperazine, N-ethylpiperazine, N-methylcyclohexylamine, imidazole, N-methylimidazole or pyrrolidine. Very preferred secondary amines are piperazine, N-methylcyclohexylamine. A very preferred tertiary amine is N-methylimidazole.

The molar ratio of the secondary or tertiary amine to perylenetetracarboxylic acids or functional derivatives thereof, especially perylene bisanhydride, is generally from 0.5:1 to 2:1, preferably from 0.8:1 to 1.3:1.

In one embodiment of the preparation process according to the invention, the aqueous reaction medium may comprise small amounts of inert water-miscible organic solvents.

The aqueous reaction medium preferably comprises less than 30% by weight of organic solvent; very preferably, less than 20% by weight of organic solvent is present in the aqueous reaction medium, especially less than 10% by weight. In general, it is favorable for process technology reasons to use as little inert organic solvent as possible, since the subsequent removal of the solvent from the solid is possible with less difficulty. The organic solvent is preferably a glycol or alcohol, for example butylglycol, or an aromatic nitrogen-containing heterocycle, for example N-methylimidazole or imidazole. Most preferably, the organic solvent is an aromatic nitrogen-containing heterocycle, for example N-methylimidazole or imidazole.

In another embodiment of the process according to the invention, the aqueous reaction medium does not comprise an organic solvent. In this case, the aqueous reaction medium preferably comprises essentially only water. This embodiment has the process technology advantage that no organic solvent has to be removed in the workup.

In general, the aqueous reaction medium which may optionally comprise small amounts of inert organic solvent is used in excess in relation to the perylenetetracarboxylic acids or functional derivatives thereof. The weight ratio used is preferably in the range from 50:1 to 5:1, very preferably from 20:1 to 7:1.

In one embodiment of the preparation process according to the invention, the inert organic solvent may simultaneously function as a catalyst (secondary or tertiary amine). In this case, the above-specified molar ratio of the secondary or tertiary amine to perylenetetracarboxylic acids or functional derivatives thereof is, of course, not applicable, since the secondary or tertiary amine is present in excess. In this case, a further addition of secondary or tertiary amine as a catalyst is of course unnecessary.

In a further embodiment of the process according to the invention, it is optionally additionally possible to add surface-active substances to the aqueous reaction medium. Suitable surface-active substances are in principle ionic or nonionic (polymeric) surfactants. Examples of surface-active substances which can be used in the process according to the invention are polyethers, which may be modified nonionically or anionically, for example ethoxylation products of long-chain alcohols or ethoxylation products of alkyl phenols.

It is thus possible in the aqueous reaction medium for either different nonionic or different ionic, especially anionic, surface-active substances, and also mixtures of nonionic and ionic, especially anionic, surface-active substances to be present.

Examples of anionic surface-active substances are the acidic phosphoric esters, phosphonic esters, sulfuric esters and/or sulfonic esters of the abovementioned modified polyethers and/or salts thereof.

The abovementioned nonionic surface-active substances based on polyethers (nonionically modified polyethers) are especially polyalkylene oxides or reaction products of alkylene oxides with alcohols, amines, aliphatic carboxylic acids or aliphatic carboxamides. According to the invention, the term "alkylene oxide" shall also be understood to mean aryl-substituted alkylene oxide, especially phenyl-substituted ethylene oxide.

Very particularly suitable block copolymers are those which have polypropylene oxide and polyethylene oxide blocks, or else poly(phenylethylene oxide) and polyethylene oxide blocks. Like the unmixed polyalkylene oxides, they can be obtained by polyaddition of these alkylene oxides to starter compounds, such as to saturated or unsaturated aliphatic and aromatic alcohols, saturated or unsaturated and aliphatic and aromatic amines, saturated or unsaturated aliphatic carboxylic acids and carboxamides. When ethylene oxide and propylene oxide are used, these starter compounds may be reacted first with ethylene oxide and then with propylene oxide or preferably first with propylene oxide and then with ethylene oxide. Further details of these block polymers can be taken from WO 2004/009688 A2 (page 7, line 20-page 9, line 26), to which reference is made explicitly in this connection.

The reaction conditions of the reaction in the process according to the invention are generally, depending, for example, on the aromatic diamine used, variable over a wide range. The reaction preferably takes place at a temperature of from 150 to 250° C., more preferably from 160 to 230° C. (thermal reaction). The reaction takes place preferably at a pressure of from 5 to 40 bar, more preferably from 5 to 25 bar. The reaction time varies with significant dependence on the nature of the substances converted and is generally from five to 40 hours.

In one embodiment, the process according to the invention for preparing perylene pigments consists of a plurality of process steps which may proceed successively in time or else simultaneously. For example, the process according to the invention comprises the following process steps:
(a) addition of aqueous reaction medium,
(b) initial charging of perylenetetracarboxylic acid or functional derivatives thereof,
(c) optional addition of inert organic solvent,
(d) optional addition of surface-active substances,
(e) addition of secondary or tertiary amine,
(f) optional homogenization of the reaction mixture,
(g) addition of aromatic diamine,
(h) thermal reaction,
(i) cooling,
(j) optional addition of inorganic basic salt,
(k) optional workup.

The sequence of steps (a)-(k) is variable, i.e. steps (a) to (k) can be performed in any sequence. Steps (a)-(k) preferably proceed successively in time in the sequence specified above. It will be appreciated that the individual components can be added either continuously or batchwise. The reaction mixture can be homogenized at elevated temperatures, for example in the range from 50 to 90° C., which are, however, lower than the temperatures of the thermal reaction. Moreover, in the thermal reaction, the temperature can be increased either continuously or stepwise up to the desired end value of the temperature. The same applies to the cooling.

The process according to the invention can be performed in any apparatus which allows the performance of the process steps described above. The apparatus for performing the individual (optional) process steps is well known to those skilled in the art.

In one embodiment of the process according to the invention, the workup step comprises a removal, for example by filtration, and a purification, for example by washing processes, of the perylene pigments.

The crude pigments initially obtained in the process according to the invention, the detailed structure of which may vary depending on the reaction conditions or starting materials specifically selected in each case, are, after workup, usually obtained as partly amorphous powder or in the form of heterogeneous crystals which can be adjusted in a single-stage or multistage reprocessing step to the application medium, for example plastics. Such processes are described, for example, in WO 2005/078023 (page 7, line 37-page 14, line 31), to which reference is made explicitly in this connection.

The perylene pigments prepared by the process according to the invention or the pigments obtained by the reprocessing steps mentioned can be incorporated into plastics by all known methods, for example by combined extrusion, rolling, kneading, pressing or milling, and the plastics comprising the perylene pigments can be processed to plastics moldings, continuous profiles, slabs, films, fibers and coatings.

Further processing possibilities, including for use in high molecular weight inorganic materials, are specified in WO 2005/078023, page 15, line 22-page 18, line 6, to which reference is made explicitly in this connection.

The inventive perylene pigments or the pigments obtained by the abovementioned reprocessing steps (WO 2005/078023) are outstandingly suitable for coloring high molecular weight organic and inorganic materials of natural and synthetic origin.

Further application possibilities are specified in WO 2005/078023, page 15, line 22-page 18, line 6, to which reference is made in its entirety in this connection. This literature reference is thus incorporated into the disclosure of the present invention. It is also possible to use the perylene pigments prepared in accordance with the invention as active components in photovoltaics.

Examples of high molecular weight synthetic organic materials include:

Polyolefins such as polyethylene, polypropylene, polybutylene, polyisobutylene and poly-4-methyl-1-pentene, polyolefin copolymers such as Luflexen® (Basell), Nordel® (Dow) and Engage® (DuPont), cycloolefin copolymers such as Topas® (Celanese), polytetrafluoroethylene (PTFE), ethylene/tetrafluoroethylene copolymers (ETFE), polyvinylidene difluoride (PVDF), polyvinyl chloride (PVC), polyvinylidene chloride, polyvinyl alcohols, polyvinyl esters such as polyvinyl acetate, vinyl ester copolymers such as ethylene/vinyl acetate copolymers (EVA), polyvinyl alkanals such as polyvinyl acetal and polyvinyl butyral (PVB), polyvinyl ketals, polyamides such as Nylon® [6], nylon [12] and nylon [6,6] (DuPont), polyimides, polycarbonate, polycarbonate copolymers and physical blends of polycarbonates with acrylic-butadiene-styrene copolymers, acrylonitrile-styrene-acrylic ester copolymers, polymethyl methacrylates, polybutyl acrylates, polybutyl methacrylates, polybutylene terephthalates and polyethylene terephthalates, polyesters such as polyethylene terephthalate (PET), polybutylene terephthalate (PBT) and polyethylene naphthalate (PEN), copolymers, transesterification products and physical mixtures (blends) of the aforementioned polyalkylene terephthalates, poly(meth)acrylates, polyacrylamides, polyacrylonitrile, poly(meth)acrylate/polyvinylidene difluoride blends, polyurethanes, polystyrene, styrene copolymers such as styrene/butadiene copolymers, styrene/acrylonitrile copolymers (SAN), styrene/ethyl methacrylate copolymers, styrene/butadiene/ethyl acrylate copolymers, styrene/acrylonitrile/methacrylate copolymers, acrylonitrile/butadiene/styrene copolymers (ABS) and methacrylate/butadiene/styrene copolymers (MBS), polyethers such as polyphenylene oxide, polyether ketones, polysulfones, polyether sulfones, polyglycols such as polyoxymethylene (POM), polyaryls such as polyphenylene, polyarylenevinylenes, silicones, ionomers, thermoplastic and thermoset polyurethanes and mixtures thereof.

Examples of high molecular weight synthetic inorganic materials include:

Low-melting borosilicate glass frits, optionally organically modified silicate sols and gels, optionally doped silicate, aluminate, zirconate and aluminosilicate coatings prepared via a sol-gel process, and sheet silicates.

For many applications, it may be advantageous first to prepare liquid water-based preparations of the inventive perylene pigments or the pigments obtained by the reprocessing steps mentioned (WO 2005/078023), which comprise water or mixtures of water and organic solvents as the liquid phase.

It is likewise advantageous to use pigment preparations which have been prepared separately beforehand and are based on a polymer or a polymer blend, one or more polyolefin waxes or mixtures thereof to achieve homogeneous, intense colorations in the case of low-melting polymers (for example most common polyolefins) or those having a lower melt viscosity (for example plasticized PVC and PVB, and blow-moldable PET). While the carrier polymer (blend) used in the case of the polymer-based pigment preparations ("masterbatch", "compound") is generally identical to the high molecular weight synthetic organic material to be colored, especially homo- and copolymeric PE and PP waxes such as Luwax® A (ethylene homopolymer; BASF), Luwax EVA (ethylene-vinyl acetate copolymer; BASF) or Licowax® PP 230 (propylene homopolymer; Clariant) are used as carrier material to prepare polyolefin wax-based pigment preparations.

In addition, the perylene pigments prepared in accordance with the invention can be used in laser welding.

The invention therefore further provides for the use of perylene pigments prepared in accordance with the invention in laser welding and a process for laser-welding materials, wherein the materials are first contacted with perylene pigments.

Materials, especially plastics, are welded by absorption of laser energy in or on the material by virtue of the laser-sensitive perylene pigments added, which, through absorption of the laser energy, lead to local heating of the material. In the case of laser welding of, for example, two materials, absorption of the laser energy gives rise to strong heating in the joining region of the materials to be welded, such that the materials melt and the two materials fuse to one another. Frequently, it is sufficient when only one of the materials comprises laser-sensitive perylene pigments in the material or as a layer on the surface. The laser weldability is dependent upon the nature of the materials, especially plastics, and upon the wavelength and the radiative power of the laser used. For example, dye lasers, $CO_2$ lasers, excimer lasers or Nd:YAG lasers are useful for laser welding for the process according to the invention.

In general, the content of perylene pigments overall is between 0.0001 and 1% by weight based on the material to be welded. The content is preferably from 0.001 to 0.1% by weight. In particular, sufficient weldability of plastics arises within this range from 0.001 to 0.1% by weight.

The perylene pigments prepared in accordance with the invention can, as described above, be incorporated into virtually all plastics with the aid of processes known to those skilled in the art, for example by extrusion, especially in order to impart laser weldability thereto. Likewise possible is incorporation into blends which include the abovementioned plastics as components, or into polymers derived from these classes, which have been modified by subsequent reactions. These materials are known in a wide variety and are commercially available.

In addition, it is possible to use the perylene pigments prepared in accordance with the invention in heat management or for thermal insulation.

The invention therefore further provides for the use of perylene pigments prepared in accordance with the invention in heat management and a process for heat management or for thermal insulation, wherein the materials are first contacted with perylene pigments prepared in accordance with the invention. In general, the perylene pigments give rise to IR absorption and thus enable heat management by virtue of the materials.

The perylene pigments are preferably in contact with windows, especially windowpanes. By virtue of the process according to the invention, the IR transmission through the window is regulated and heat management of the room behind the window is thus enabled. Of course, as well as windows in buildings, they may, for example, also be windows of automobiles, aircraft or machines with driver's cabs.

The process according to the invention permits the efficient preparation of perylene pigments. In the process according to the invention, it is possible to dispense with the use of organic solvents. The process according to the invention is notable for a simple reaction, with which perylene pigments are obtainable in high purity at high conversions.

The above embodiments of the process according to the invention and the examples which follow illustrate the present invention by way of example. However, many further variations of the process and combinations of the features of the process according to the invention are conceivable to the person skilled in the art without leaving the scope of the claims.

EXAMPLES

Example 1

An autoclave was initially charged with 200 g of perylene bisanhydride as 50% by weight water-moist presscake, corresponding to 0.255 mol, 1100 g of water and 22 g of piperazine, corresponding to 0.255 mol, which were homogenized by stirring at 70° C. After adding 69 g of 1,2-diaminobenzene, corresponding to 0.637 mol, the reaction suspension was heated to 210° C. within four hours and stirred at this temperature for 18 hours.

After cooling to 70° C., 20 g of potash dissolved in 1000 ml of water were added and the mixture was stirred at 70° C. The suspension was filtered and washed successively with water, 10% acetic acid and water again. Drying at 80° C. afforded 133 g of perylene pigment, corresponding to 97.5% of theory, in the form of a black powder.

Example 2

An autoclave was initially charged with 100 g of perylene bisanhydride, precomminuted in a ball mill, corresponding to 0.255 mol, 1000 g of water and 26 g of N-methylcyclohexylamine, corresponding to 0.230 mol, which were homogenized by stirring at 70° C. After adding 69 g of 1,2-diaminobenzene, corresponding to 0.637 mol, the reaction suspension was heated to 205° C. and stirred at this temperature for 24 hours.

After cooling to 70° C., 30 g of potash dissolved in 1000 ml of water were added and the mixture was stirred at 70° C. The suspension was filtered and washed successively with 2.5% aqueous potash solution, water, 5% sulfuric acid and water again. Drying at 80° C. afforded 129 g of perylene pigment, corresponding to 94.3% of theory, in the form of a black powder.

Example 3

An autoclave was initially charged with 100 g of perylene bisanhydride, precomminuted in a ball mill, corresponding to 0.255 mol, 900 g of water and 100 g of N-methylimidazole, which were homogenized by stirring at 70° C. After adding 69 g of 1,2-diaminobenzene, corresponding to 0.637 mol, the reaction suspension was heated to 210° C. and stirred at this temperature for 24 hours.

After cooling to 70° C., 30 g of potash dissolved in 1000 ml of water were added and the mixture was stirred at 70° C. The suspension was filtered and washed successively with 2.5% aqueous potash solution, water, 5% sulfuric acid and water again. Drying at 80° C. afforded 133 g of perylene pigment, corresponding to 97.5% of theory, in the form of a black powder.

Example 4

An autoclave was initially charged with 100 g of perylene bisanhydride, precomminuted in a ball mill, corresponding to 0.255 mol, 750 g of water and 69 g of 1,2-diaminobenzene, corresponding to 0.637 mol, which were heated to 205° C. and stirred at this temperature for 24 hours.

After cooling to 70° C., 30 g of potash dissolved in 1000 ml of water were added and the mixture was stirred at 70° C. The suspension was filtered and washed successively with 2.5% aqueous potash solution, water, 5% sulfuric acid and water again. Drying at 80° C. afforded 128 g of perylene pigment, corresponding to 93.8% of theory, in the form of a black powder.

Example 5

An autoclave was initially charged with 100 g of perylene bisanhydride, precomminuted in a ball mill, corresponding to 0.255 mol, 800 g of water and 16 g of pyrrolidine, corresponding to 0.230 mol, which were homogenized by stirring at 70° C. After adding 69 g of 1,2-diaminobenzene, corresponding to 0.637 mol, the reaction suspension was heated to 160° C. and stirred at this temperature for 24 hours.

After cooling to 70° C., 30 g of potash dissolved in 1000 ml of water were added and the mixture was stirred at 70° C. The suspension was filtered and washed successively with 2.5% aqueous potash solution, water, 5% sulfuric acid and water again. Drying at 120° C. and 100 mbar affords 128 g of perylene pigment, corresponding to 93.6% of theory, in the form of a black powder.

Example 6

An autoclave was initially charged with 100 g of perylene bisanhydride, corresponding to 0.255 mol, 1000 g of water and 26 g of N-methylcyclohexylamine, corresponding to 0.230 mol, which were homogenized by stirring at 70° C. After adding 83 g of 1,8-diaminonaphthalene, corresponding to 0.523 mol, the reaction suspension was heated to 160° C. and stirred at this temperature for eight hours.

After cooling to 70° C., 30 g of potash dissolved in 1000 ml of water were added and the mixture was stirred at 70° C. The suspension was filtered and washed successively with 2.5% aqueous potash solution, water, 5% acetic acid and water again. Drying at 100° C. and 100 mbar affords 161 g of perylene pigment, corresponding to 99% of theory, in the form of a black powder.

Example 7

An autoclave was initially charged with 116 g of perylene bisanhydride, corresponding to 0.290 mol, 1200 g of water and 24 g of piperazine, corresponding to 0.287 mol, which were homogenized by stirring at 90° C. After adding 92 g of 1,8-diaminonaphthalene, corresponding to 0.573 mol, the reaction suspension was heated to 210° C. and stirred at this temperature for 14 hours.

After cooling to 70° C., 30 g of potash dissolved in 1300 ml of water were added and the suspension was stirred at 85° C. The suspension was filtered and washed successively with water, 10% acetic acid and water again. Drying at 100° C. and 100 mbar affords 184 g of perylene pigment, corresponding to >99% of theory, in the form of a black powder.

The invention claimed is:

1. A process for preparing a perylene pigment of the general formula (Ia) or (Ib)

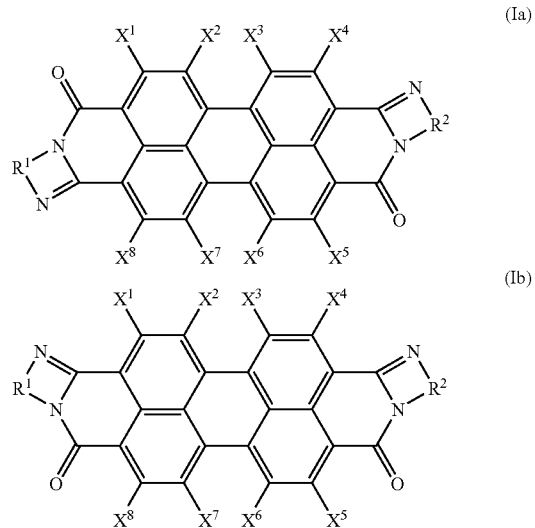

or a mixture thereof, the process comprising:
reacting, in the presence of a secondary or tertiary amine in an aqueous reaction medium,
(A) a perylenetetracarboxylic acid, a perylenetetracarboxylic anhydride, a perylenetetracarbonyl chloride, or a salt of the perylenetetracarboxylic acid, with
(B) an aromatic diamine, wherein
$R^1$ and $R^2$ are independently phenylene, naphthylene, or pyridylene, and are optionally mono- or polysubstituted by $C_i$-$C_{22}$-alkyl, $C_3$-$C_{22}$-alkenyl, $C_1$-$C_{22}$-alkoxy, hydroxyl, halogen, or a mixture thereof, and
$X^1$, $X^2$, $X^3$, $X^4$, $X^5$, $X^6$, $X^7$, and $X^8$ are independently hydrogen or halogen.

2. The process of claim 1, wherein $R^1$ and $R^2$ are each unsubstituted phenylene.

3. The process of claim 2, wherein the aqueous reaction medium comprises essentially no organic solvent.

4. The process of claim 1, wherein the aqueous reaction medium comprises up to 30% by weight of an organic solvent.

5. The process of claim 4, wherein the organic solvent is an aromatic nitrogen-containing heterocycle.

6. The process of claim 5, wherein the aromatic nitrogen-containing heterocycle is N-methylimidazole.

7. The process of claim 1, wherein the secondary or tertiary amine is selected from the group consisting of piperazine, N-(2-hydroxyethyl)piperazine, diethanolamine, N,N'-dimethylpiperazine, N-ethylpiperazine, N-methylcyclohexylamine, imidazole, N-methylimidazole, and pyrrolidine.

8. The process of claim 1, wherein the reaction employs from 0.5 to 2.0 molar equivalents of a secondary or tertiary amine based on the perylenetetracarboxylic acid, the perylenetetracarboxylic anhydride, the perylenetetracarbonyl chloride, or the salt of the perylenetetracarboxylic acid.

9. The process of claim 1, wherein the reaction is performed at a temperature in a range from 150 to 250° C.

10. The process of claim 1, wherein the reaction is performed additionally in the presence of a surface-active substance.

11. The process of claim 1, wherein $R^1$ and $R^2$ are each unsubstituted naphthylene.

12. The process of claim 5, wherein the aromatic nitrogen-containing heterocycle is imidazole.

13. The process of claim 1, wherein the secondary or tertiary amine is piperazine.

14. The process of claim 1, wherein the secondary or tertiary amine is N-methylimidazole.

15. The process of claim 1, wherein the secondary or tertiary amine is N-methylcyclohexylamine.

16. The process of claim 1, wherein the secondary or tertiary amine is N,N'-dimethylpiperazine.

17. The process of claim 1, wherein the secondary or tertiary amine is N-ethylpiperazine.

18. The process of claim 1, wherein the secondary or tertiary amine is diethanolamine.

19. The process of claim 1, wherein the secondary or tertiary amine is imidazole.

20. The process of claim 1, wherein the secondary or tertiary amine is N-(2-hydroxyethyl)piperazine.

21. The process of claim 1, wherein the secondary or tertiary amine is pyrrolidine.

* * * * *